United States Patent [19]
Yoshikawa et al.

[11] Patent Number: 5,657,301
[45] Date of Patent: Aug. 12, 1997

[54] AUTOMATIC CHANGER SYSTEM CAPABLE OF REWRITING A CONTROL PROGRAM FOR CONTROLLING THE SYSTEM

[75] Inventors: Shoji Yoshikawa; Shinya Matsumoto, both of Tokyo, Japan

[73] Assignee: NKK Corporation, Tokyo, Japan

[21] Appl. No.: 446,818

[22] PCT Filed: Oct. 6, 1994

[86] PCT No.: PCT/JP94/01672

§ 371 Date: Aug. 25, 1995

§ 102(e) Date: Aug. 25, 1995

[30] Foreign Application Priority Data

Oct. 8, 1993 [JP] Japan ................... 5-253448

[51] Int. Cl.⁶ ................................................. G11B 17/22
[52] U.S. Cl. ........................................... 369/30; 369/34
[58] Field of Search ........................... 369/30, 32, 33, 369/34, 36, 37, 38, 39, 47, 48

[56] References Cited

U.S. PATENT DOCUMENTS 5,235,568  8/1993  Masaru ......................... 369/2
5,392,264  2/1995  Hira ............................. 369/30
5,446,714  8/1995  Yoshio et al. ................. 369/32

FOREIGN PATENT DOCUMENTS 58-178456  10/1983  Japan.
62-143263   6/1987  Japan.
63-58360    4/1988  Japan.

*Primary Examiner*—Tan Dinh
*Attorney, Agent, or Firm*—Michael N. Meller

[57] ABSTRACT

This automatic changer system easily performs the operation of rewriting a program and acquiring the data of the system. The system includes program rewriting means (12) responsive to the application of a program rewrite command for selecting a storage medium (10) storing a new control program, reading in the new control program, erasing the previously stored control program stored in storage means (11) and storing the new control program in the storage means (11).

18 Claims, 8 Drawing Sheets

AUTOMATIC CHANGER SYSTEM CAPABLE OF REWRITING A CONTROL PROGRAM FOR CONTROLLING THE SYSTEM

TECHNICAL FIELD

The present invention relates to an automatic changer system or a large capacity storage system adapted for example to effect the selection, recording and reproduction of a plurality of storage media and more particularly to the modification or improvement of a program for a control of the system.

BACKGROUND ART

With automatic changer systems heretofore known in the art, when a program for a control (e.g., a positioning control for the disc transfer mechanism) of the system was modified or improved, it was necessary to change the memory storing the stored program of the system.

In addition, the automatic changer system was frequently large in weight and also it was nearly impossible for those having no technical knowledge to perform the operation of removing the outer casing of the system and changing the memory safely. As a result, it was the practice so that a technical expert went to the installation place of the system to change the memory storing the stored program of the system and thereby to modify or improve the program for effecting a control of the system.

Further, there was the necessity to acquire the data of such information (e.g., the hours of operation the number of times of operation, the error contents, the number of errors occurred, etc.,) of the system for the purpose of preventive maintenance, fault analysis, etc. In this case, it was effected by the expert by performing the necessary operations by use of an exclusive software, jigs, etc.

DISCLOSURE OF INVENTION

It is an object of the present invention to provide an automatic changer system so designed that when a control program for controlling the system is modified or improved, even an ordinary user can easily perform without any expert technical knowledge the operation of rewriting the program and acquiring the data of the system.

To accomplish the above object, an automatic changer system according to one aspect of the present invention includes an insertion/discharge unit for inserting and discharging a storage medium storing a program and data, a medium storage unit for storing a plurality of storage media, a media transfer unit for selecting one of a plurality of storage media from the insertion/discharge unit or the medium storage unit, a control unit including storage means storing a control program for controlling the selection of the storage media, and program rewriting means responsive to a program rewrite command to read in a new control program from the storage medium and replace the control program stored in the storage means with the new control program.

In accordance with the present invention, when a program rewrite command is applied, a new control program is read in from the storage medium by the program rewriting means and the Control program stored in the storage means is replaced with the new control program.

In accordance with the present invention of the abovementioned construction, by virtue of the fact that in response to a program rewrite command the program rewriting means reads in a new control program from the storage medium and the control program stored in the storage means is replaced with the new control program, the rewriting of the control program can be easily effected without requiring any expert knowledge.

An automatic changer system according to another aspect of the present invention consists in the abovementioned system further including information recording means whereby when an intra-system stored information recording command is applied, the information stored in the storage means is written into the storage medium.

In accordance with the present invention, When an intra-system stored information recording command is applied, the information stored in the storage means is written into the storage medium by the information recording means.

In accordance with the present invention of the abovementioned construction, by virtue of the fact that in response to the application of an intra-system stored information recording command the information stored in the storage means is written into the storage medium by the information recording means, the acquisition of the system data stored in the storage means can be easily effected without requiring any expert knowledge.

An automatic changer system according to still another aspect of the present invention includes, in addition to the previously mentioned medium insertion/discharge unit, medium storage unit, medium transfer unit and control unit, program rewriting means whereby in response to the application of a program rewrite command, the storage medium storing a new control program is selected to read in the new control program and thus the control program stored in storage means is erased to store the new control program in the storage means.

In accordance with the present invention, when a program rewrite command is applied, the program rewriting means selects the storage medium storing a new control program, reads in the new control program, erase the control program stored in the storage means and stores the new control program in the storage means.

In accordance with the present invention of the abovementioned construction, by virtue of the fact that in response to the application of a program rewrite command the program rewriting means selects the storage medium storing a new control program, reads in the new control program, erases the control program stored in the storage means and stores the new control program in the storage means, the rewriting of the control program can be effected easily without requiring any expert knowledge.

An automatic changer system according to still another aspect of the present invention consists in the abovementioned system including information recording means whereby in response to the application of an intrasystem stored information recording command the storage medium for storing the information stored in the storage means is selected and the information is written into the storage medium.

In accordance with the present invention, when an intra-system stored information recording command is applied, the information recording means selects the storage medium for storing the information stored in the storage means and writes the information into the storage medium.

In accordance with the present invention of the abovementioned construction, by virtue of the fact that in response to the application of an intra-system stored information recording command the information recording means selects the storage medium for storing the information stored in the storage means and writes the information into the storage medium, the acquisition of the system data stored in the storage means can be easily performed without requiring any expert knowledge.

An automatic changer system according to still another aspect of the present invention includes, in addition to the above-mentioned medium insertion/discharge unit, medium storage unit, medium transfer unit and control unit, a recording/reproducing unit for reading and writing information from and into the storage medium, and program rewriting means whereby in response to a program rewrite command the storage medium storing a new control program is selected by the medium transfer unit to read in the new control program from the recording/reproducing unit and the control program stored in the storage means is erased to store the new control program in the storage means.

In accordance with the present invention, the program rewriting means responds to the application of a program rewrite command so that the storage medium storing a new control program is selected by the medium transfer unit to read the new control program from the recording/reproducing unit and the control program stored in the storage means is erased to store the new control program in the storage means.

In accordance with the present invention of the above-mentioned construction, by virtue of the fact that the program rewriting means responds to the application of a program rewrite command so that the storage medium storing a new control program is selected by the medium transfer unit to read in the new control program from the recording/reproducing unit and the control program stored in the storage means is erased to store the new control program in the storage means, the rewriting of the control program can be performed easily without requiring any expert knowledge.

An automatic changer system according to still another aspect of the present invention consists in the above-mentioned system including information recording means whereby in response to the application of an intrasystem stored information recording command the storage medium for storing the information stored in the storage means is selected by the medium transfer unit and the information is read into the storage medium from the recording/reproducing unit.

In accordance with the present invention, the information recording means is responsive to the application of an intra-system stored information recording command so that the storage medium for storing the information stored in the storage means is selected by the medium transfer unit and the information is read into the storage medium from the recording/reproducing unit.

In accordance with the present invention of the above-mentioned construction, by virtue of the fact that the information recording means is responsive to the application of an intra-system stored information recording command so that the storage medium for storing the information stored in the storage means is selected by the medium transfer unit and the information is read into the storage medium from the recording/reproducing unit, the acquisition of the system data stored in the storage means can be effected easily without requiring any expert knowledge.

An automatic changer system according to still another aspect of the present invention consists in the above-mentioned system in which a program rewrite command is applied after a password has been inputted normally and after a validation operation has been normally effected two times.

In accordance with the present invention, a program rewrite command is applied after the password has been inputted normally and the validation operation has been normally performed two times.

In accordance with the present invention of the above-mentioned construction, by virtue of the fact that a program rewrite command is applied after the password has been inputted normally and after the validation operation has been normally effected twice, there is the effect of eliminating the danger of the control program being rewritten due to any malfunction and the accurate rewriting of the control program can be effected.

An automatic changer system according to still another aspect of the present invention consists in the above-mentioned system in which a program rewrite command is applied from an external host computer.

In accordance with the present invention, a program rewrite command is applied from the host computer.

In accordance with the present invention of the above-mentioned construction, by virtue of the fact that a program rewrite command is applied from the external host computer, it is possible to simultaneously apply a program rewrite command to a plurality of automatic changer systems so as to simultaneously rewrite the control programs of the plurality of automatic changer systems by the external host computer.

BEST MODE FOR CARRYING OUT THE INVENTION

Figure 1:
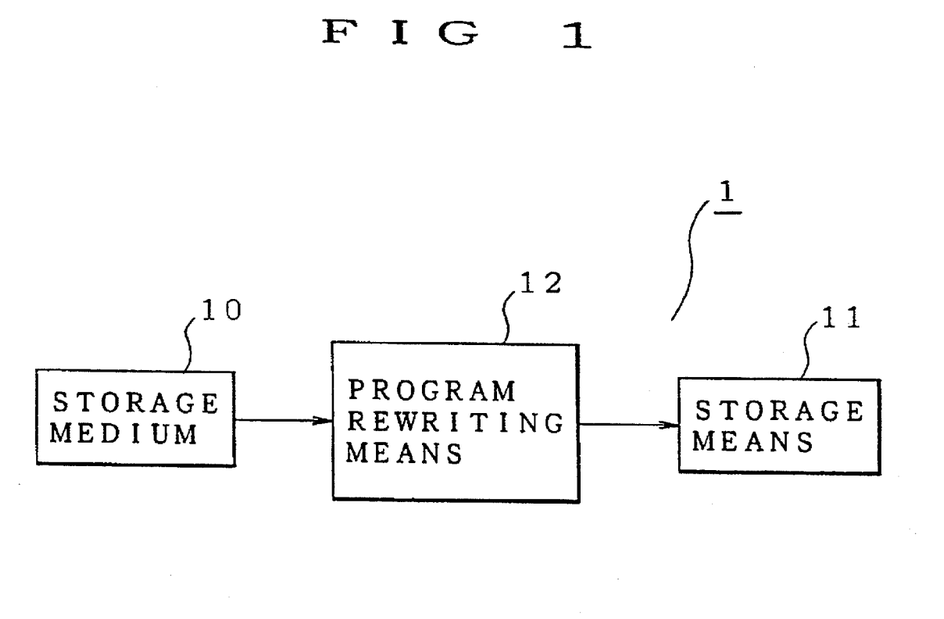
FIG. 1 is a block diagram showing the program rewriting operation of an automatic changer system according to an embodiment of the present invention.

In the block diagram of FIG. 1, numeral 1 designates an automatic changer system, and 10 a storage medium for storing a control program and operational condition data. Numeral 11 designates storage means for storing the control program for controlling the system and data of the operating conditions. Numeral 12 designates program rewriting means for reading in the change control program written in the storage medium 10, erasing the control program stored in the storage means and storing the change control program in the storage means 11, and the control program of the automatic changer system is written anew by the program rewriting means 12.

Figure 2:
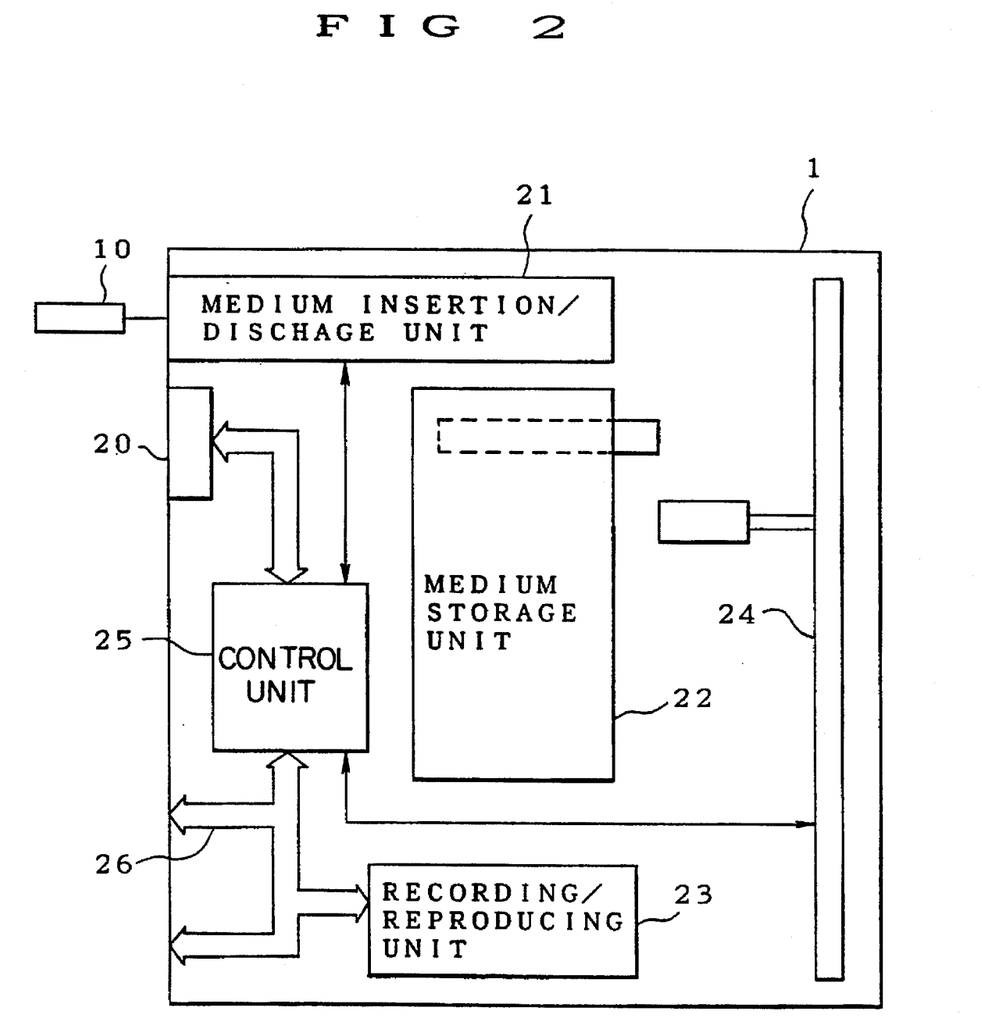
FIG. 2 is a block diagram showing the overall construction of the embodiment.

Referring now to the block diagram of FIG. 2, numeral 20 designates a control panel for operating the system, and 21 a medium insertion/discharge unit for inputting and outputting the storage medium 10. Numeral 22 designates a medium storage unit for storing the storage medium 10, and 23 a recording/reproducing unit for reading and writing a program and data in the storage medium 10.

Also, numeral 24 designates a medium transfer unit for transferring the storage medium 10 between the medium insertion/discharge unit 21, the medium storage unit 22 and the recording/reproducing unit 23, respectively, and 25 a control unit for controlling the system.

On the other hand, numeral 26 designates a communication path for effecting the communication between the recording/reproducing unit 23 and the control unit 25 and the outside, and the storage medium 10 is stored in the medium storage unit 22 from the medium insertion/discharge unit 21 or the medium storage unit 22 storing a plurality of storage media 10 is inserted thus storing the storage media in the system.

Figure 3:
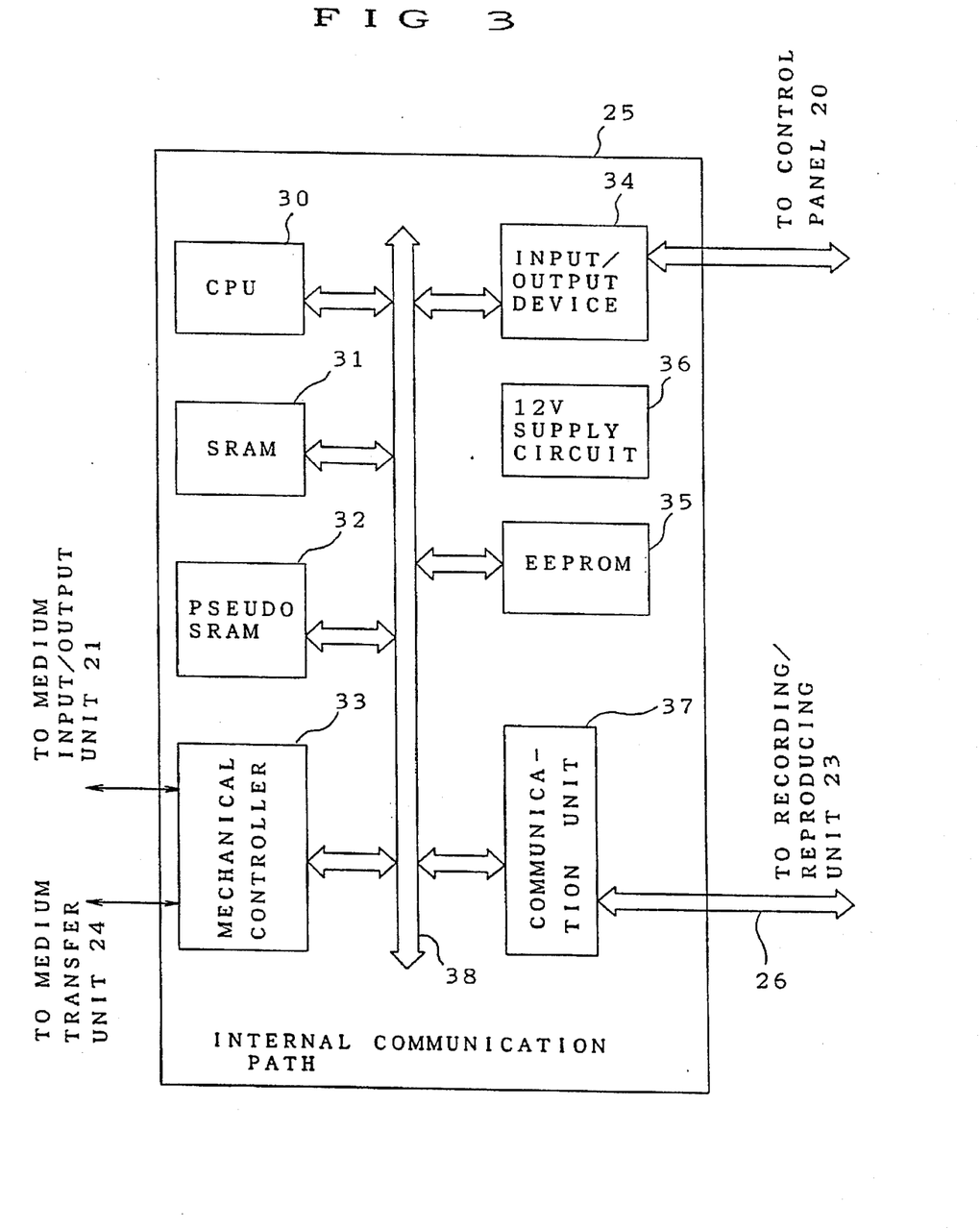
FIG. 3 is a block diagram showing the construction of the control unit of FIG. 2.

Referring now to the block diagram of FIG. 3, numeral 30 designates a microcomputer (hereinafter referred to as a CPU) for performing the processes of the control unit 25. Numeral 31 designates a SRAM used as a work area or the like of the control unit 25, and 32 a pseudo SRAM for storing a program for rewriting. Numeral 33 designates a mechanical controller for controlling the medium insertion/discharge unit 21 and the medium transfer unit 24, and 34 an input-output device connected to the control panel 20. Numeral 35 designates an EEPROM storing the control program, etc., of the control unit 25, and the storage means 11 is formed by the SRAM 31, the pseudo SRAM 32 and the EEPROM 35.

Numeral 36 designates a 12-V supply circuit for supplying 12 V for the purpose of erasing the contents of the EEPROM 35 or for the writing of data. Numeral 37 designates a communication unit for effecting the communication with the recording/reproducing unit 23, etc., through the communication path 26, and the CPU 30, the SRAM 31, the pseudo SRAM 32, the mechanical controller 33, the input-output device 34, the EEPROM 35, the 12-V supply circuit 36 and the communication unit 37 are connected with one another through an internal communication path 38.

Figure 7:
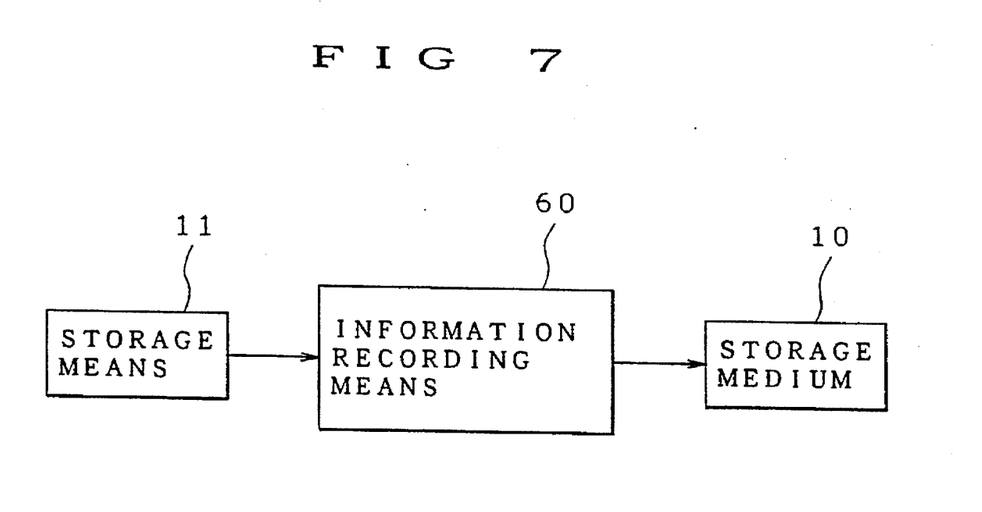
FIG. 7 is a block diagram showing the intra-system stored information recording operation of the embodiment.

Referring now to the block diagram of FIG. 7, numeral 60 designates information recording means whereby the intra-system stored information stored in the storage means 11 is stored in the storage medium 10.

Figure 9:
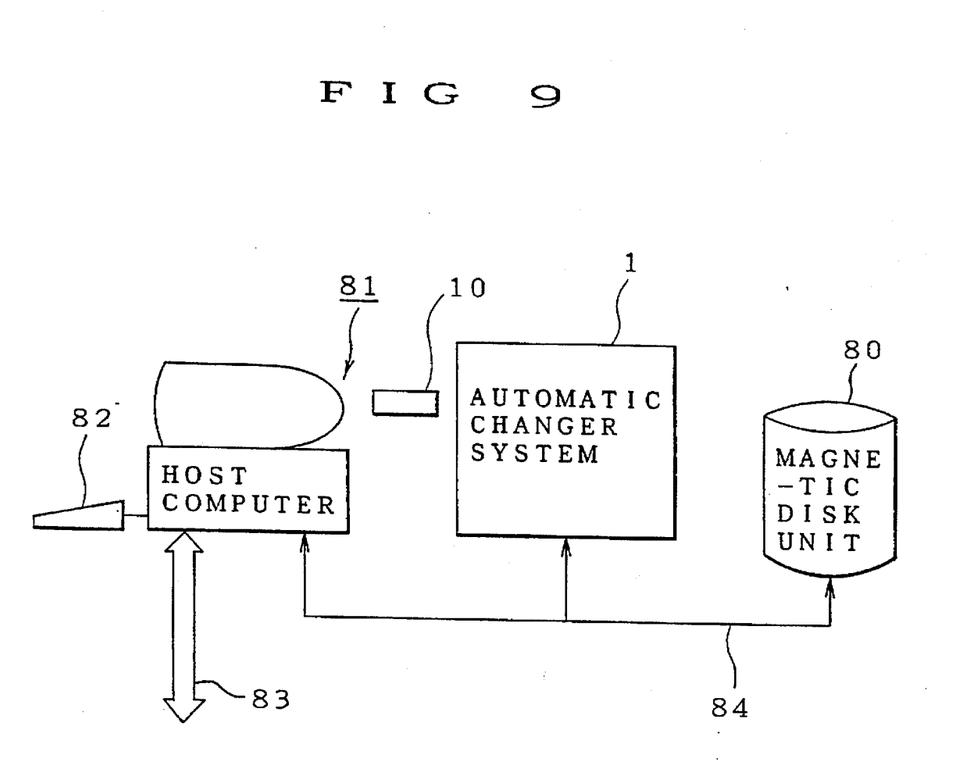
FIG. 9 is a block of a large-capacity storage system employing an automatic changer system.

Referring now to the block diagram of FIG. 9, numeral 80 designates a magnetic disc unit, 81 a host computer, and 82 a keyboard for operating the host computer 81. Numeral 83 designates a LAN for connecting the host computer 81 to other host computers and terminal computers, and the automatic changer system 1, the magnetic disc unit 81 and the host computer 81 are interconnected by an SCSI interface 84.

Then, the magnetic disc unit 80 is adapted for use as a cache. More specifically, of the programs and the data in the plurality of storage media 10 within the automatic changer system 1 those used frequently are stored in the magnetic disc unit 80.

As a result, where the programs and data stored in the magnetic disc unit 80 are to be read out, they are read from the magnetic disc unit 80 thus forming a high-speed response large-capacity memory system for the host computer 81.

Figure 4:
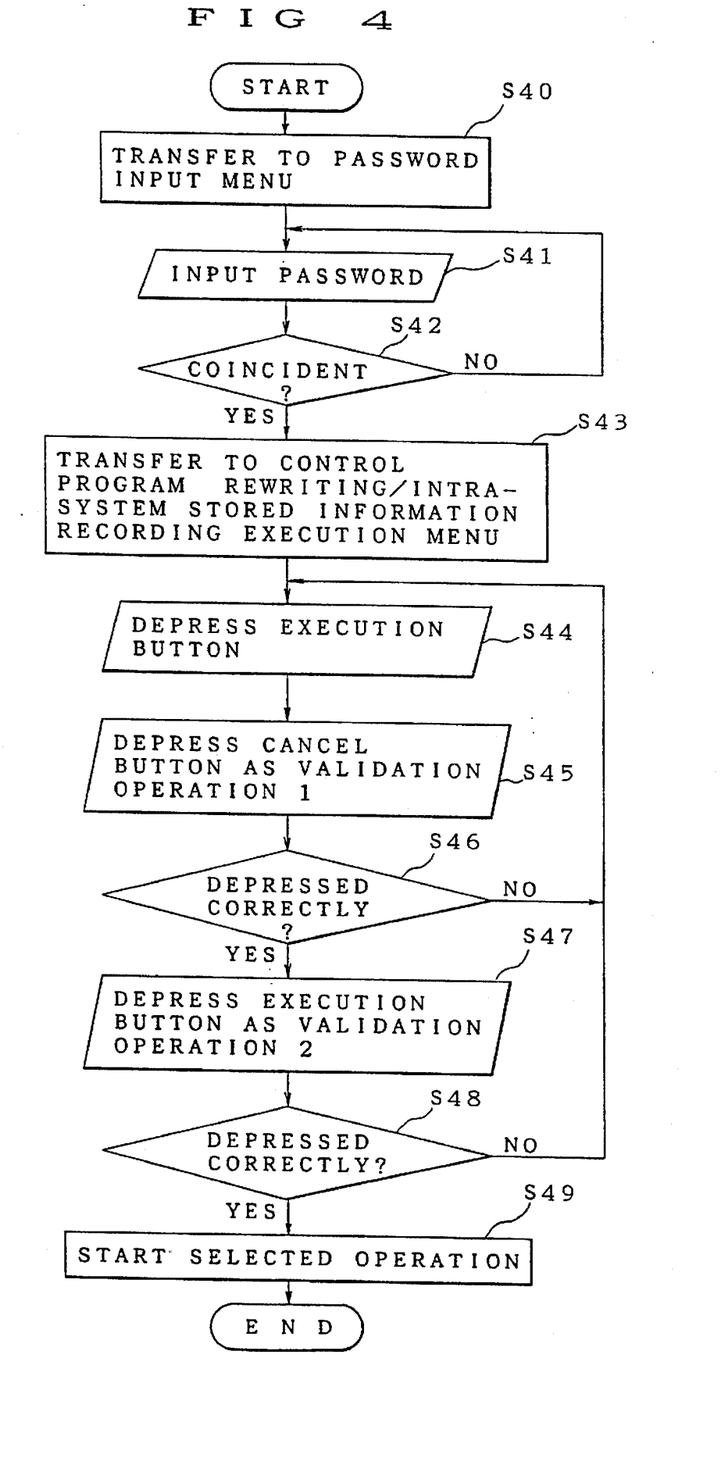
FIG. 4 is a flow chart showing the operation during the program rewriting and intra-system stored information recording of the embodiment.

Next, the operation of starting the rewriting of a control program and the recording of intra-system stored information will be described with reference to FIG. 4.

Firstly, a password input menu is displayed (S40) so that a password is inputted by the display (S41). Then, it is determined whether the password inputted at the S41 is coincident with a given value (S42).

If there is no coincidence at the S42, then a return is made to the S41. On the contrary, if there is the coincidence at the S42, a control program rewriting and intra-system stored information recording execution menu is displayed (S43).

Then, the control program rewriting or the intrasystem stored information recording is selected and an execution button is depressed (S44); thereafter, a cancel button is depressed as a validation operation. 1(S45). Then, whether the execution button and the cancel button have been depressed correctly at the S44 and S45, respectively, is determined (S46).

Then, if the buttons have not been depressed correctly at the S46, a return is made to the S44. On the contrary, if the buttons have been depressed correctly at the S48, the execution button is depressed as a validation operation 2 (S47). Then, whether the execution button has been depressed correctly at the S47 is determined (S48).

Thus, if the button has not been depressed correctly, a return is made to the S44. On the contrary, if the button has been depressed correctly at the S48, the storage medium 10 storing a new control program or the storage medium 10 for recording the intra-system stored information is selected from the medium insertion/discharge unit 21 or the medium storage unit 22 by the medium transfer unit 24.

Then, the selected storage medium 10 is transferred to the recording/reproducing unit 23. Thus, the operation of rewriting the selected control program or recording the intra-system stored information is started (S49).

As described hereinabove, the processing is not transferred to the execution menu for the control program rewriting or the intra-system stored information recording until the password has been inputted correctly. Also, after the transfer has been made to the execution menu, the validation operations are performed so as to prevent the execution of the program rewriting due to any erroneous operation of the operator.

Figure 5:
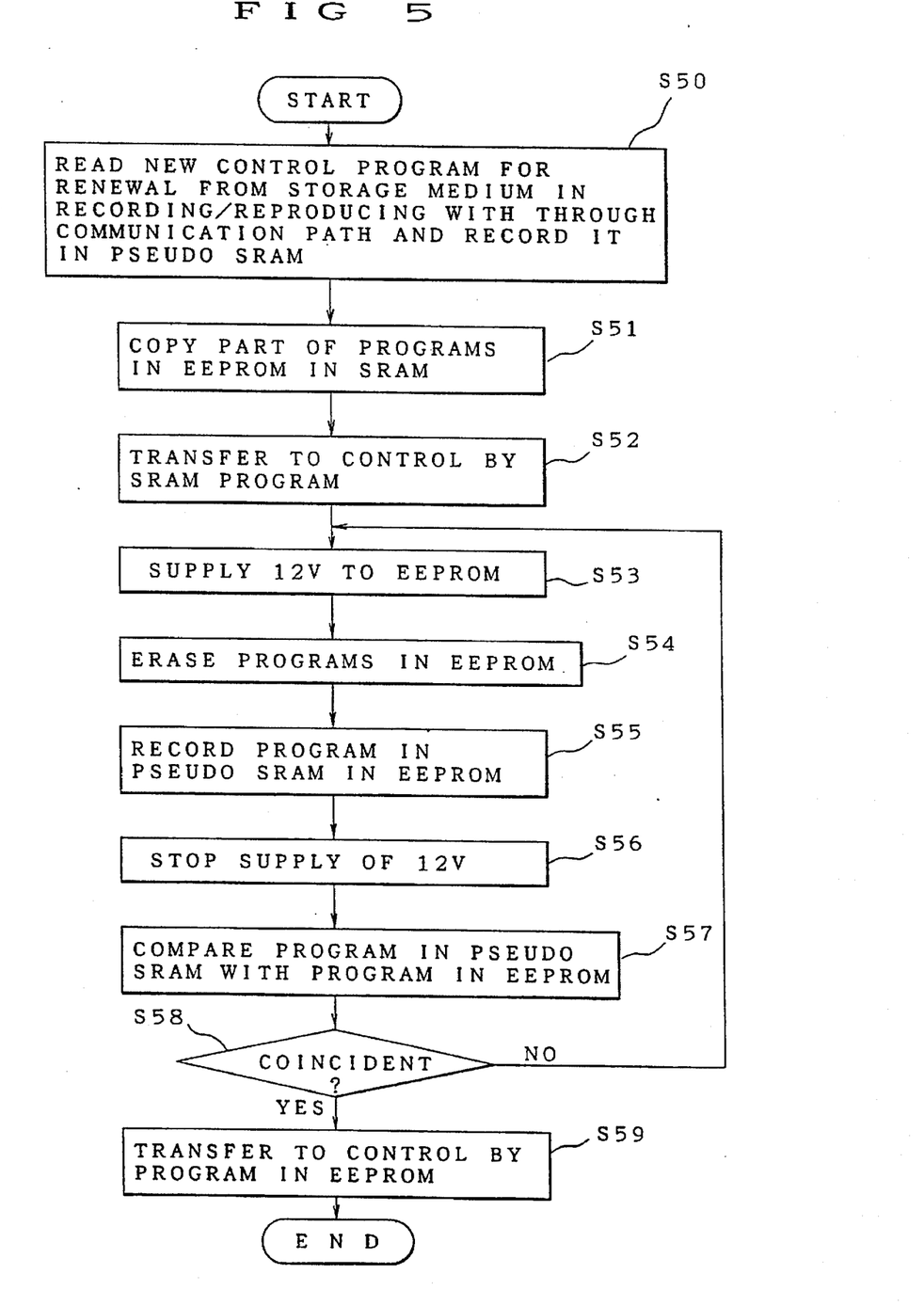
FIG. 5 is a flow chart showing the program rewriting operation of the embodiment.

Next, the control program rewriting operation will be explained with reference to FIGS. 5 and 6.

Firstly, the storage medium 10 storing for example a new control program for renewal is transferred from the medium insertion/discharge unit 21 or the medium storage unit 22 into the recording/reproducing unit 23 by the medium transfer unit 24.

Then, the new control program or the like stored in the storage medium 10 is read out through the recording/reproducing unit 23. Then, it is stored in the pseudo SRAM 32 through the communication path 26 (S50, FIG. 6(b)). Then, the program renewing program in the EEPROM 35 is copied into the SRAM 31 (S51, FIG. 6(c)). Then, the processing is advanced to the control by the program transferred to the SRAM 31 (S52, FIG. 6(d)).

Figure 6:
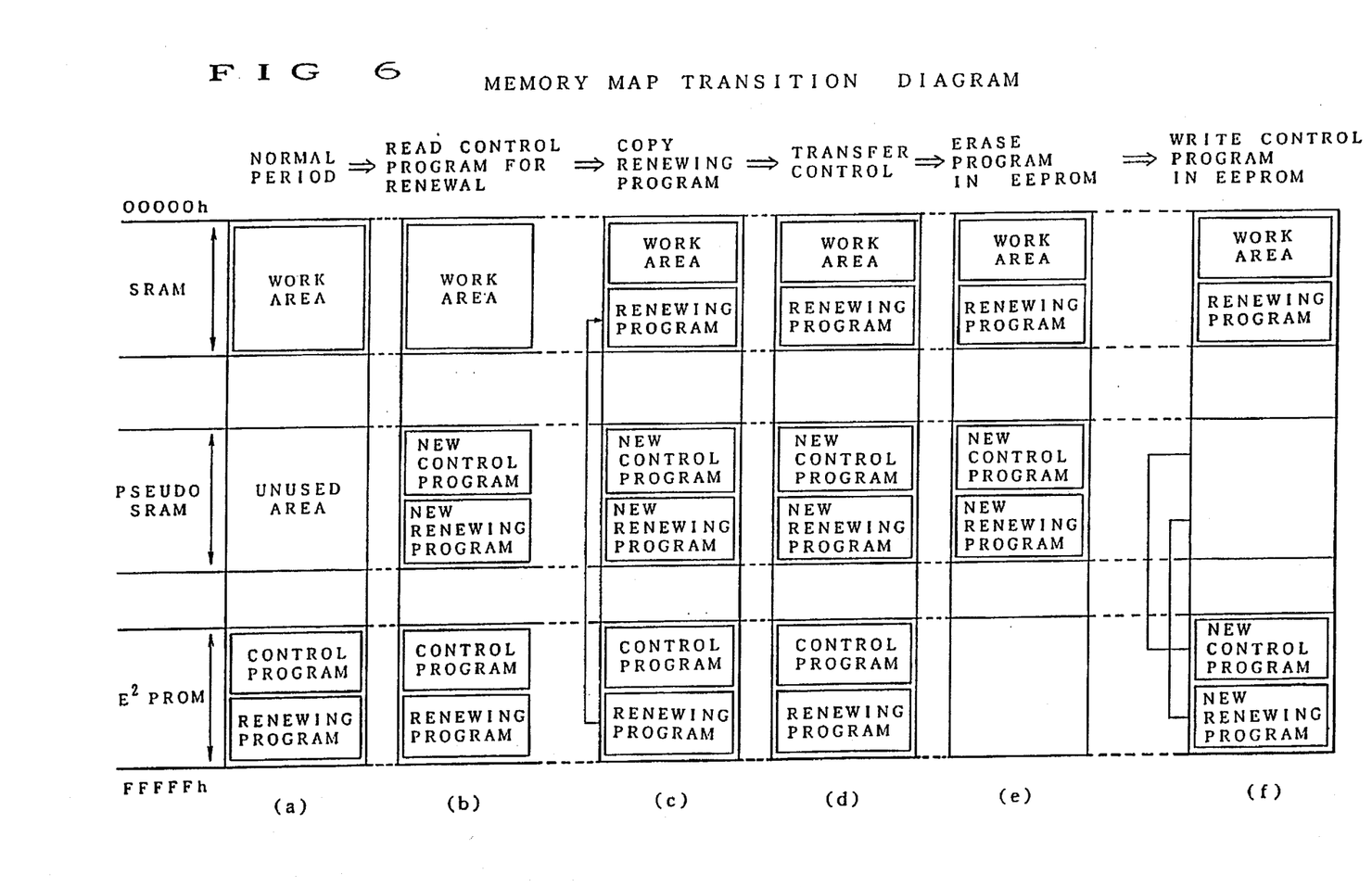
FIG. 6 is an explanatory diagraph showing the various states of the memory during the program rewriting of the embodiment.

Thereafter, 12V is supplied to the EEPROM 35 (S53) and the program in the EEPROM 35 is erased (S54, FIG. 6(a)).

Then, the program in the pseudo SRAM 32 is stored in the EEPROM 35 (S55, FIG. 6(f)) and the supply of 12V to the EEPROM 35 is interrupted (S56).

Thereafter, the program in the pseudo SRAM 32 is compared with the program in the EEPROM 35 (S57) so as to determine whether the programs are in coincidence with each other (S58). Thus, if there is no coincidence at the S58, a return is made to the S53, whereas if there is the coincidence, a transfer is made to the control by the program in the EEPROM 35 (S59).

Figure 8:
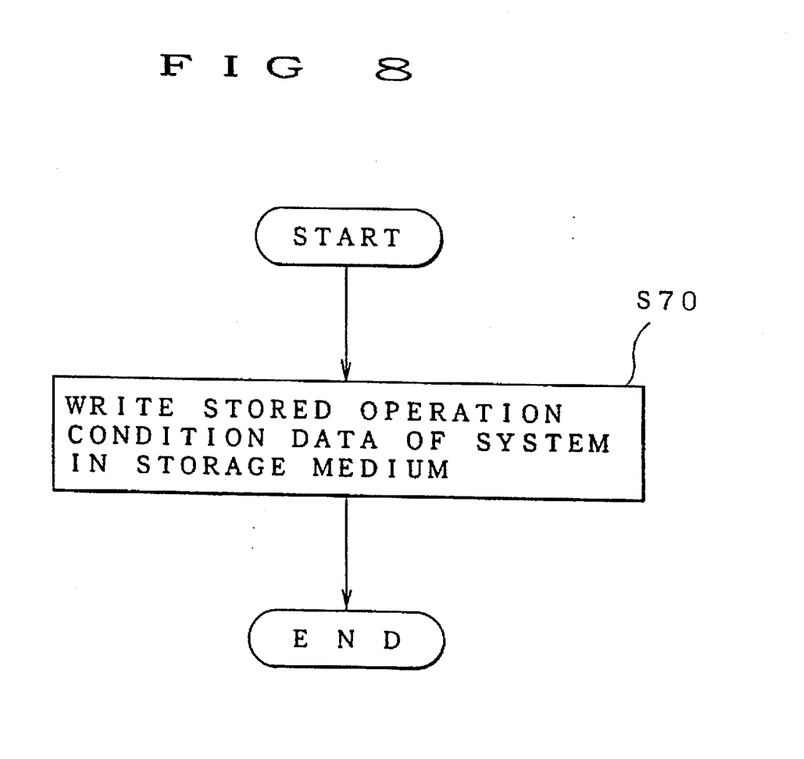
FIG. 8 is a flow chart showing the intra-system stored information recording operation of the embodiment.

Next, the intra-system stored information recording operation will be explained with reference to FIG. 8.

Firstly, the storage medium 10 for storing the stored information is transferred into the recording/reproducing unit 23 from the medium insertion/discharge unit 21 or the medium storage unit 22 by the medium transfer unit 24.

Then, the data stored in the system, e.g., the hours of operation, the number of times of operation, the contents of errors, the number of errors occurred, etc., are written into the storage medium 10 through the recording/reproducing unit 23(S70).

It is to be noted that this embodiment shows the case in which the operation of rewriting the control program or recording the intra-system stored information is started by operating the control panel of the system. However, it is possible to start the operation of rewriting the control program or recording the intra-system stored information through the operation of the host computer 81 shown in FIG. 9. In this case, it is possible to preliminarily insert storage media 10 storing replacing programs in a plurality of systems so that the rewriting of the control programs an the recording of the intra-system stored information can be effected through the interface and the LAN by the operations in the host computer 81.

Also, this embodiment shows the case in which a new control program is stored in the pseudo SRAM during the rewriting of the control program. However, it is possible to design so that the storage of the program during the rewriting and the execution of the renewing program can be performed by only the SRAM 31 used as a work area or the like. Further, this embodiment is not limited to it and the ordinary storage means may be used.

Further, this embodiment shows the case in which the renewing program for performing only the renewing of the program is provided separately from the control program. However, the control program may be adapted to serve this function.

Still further, this embodiment shows the case in which the new control program for renewal purposes is first stored in the RAM and then the renewing of the program is effected. However, it is possible to design so that the renewing program or the control program having a program renewing function is transferred from the EEPROM 35 and the contents of the EEPROM 35 are erased. And then control program or the like stored in the storage medium 10 is directly stored in the EEPROM 35.

As mentioned hereinabove, in accordance with this embodiment the program stored in the EEPROM 35 is replaced by the program stored in the storage medium 10 through the given operations. Also, the data stored in the system are stored in the storage medium through the given operations. Thus, even the ordinary user can effect the rewriting of the program for program renewing purposes and the acquisition of the stored data without requiring any expert knowledge.

We claim:

1. An automatic changer system capable of rewriting a control program for controlling the system comprising:

a medium insertion/discharge unit for inserting and discharging a storage medium storing a program and data;

a medium storing unit for storing at least one storage medium storing a program and data;

a medium selecting unit for selecting a specific storage medium from a plurality of storage media comprising the storage medium inserted in said medium insertion/discharge unit and at least one storage medium stored in said medium storing unit;

a control unit for controlling a selection of a storage medium in said medium selecting unit according to a control program for controlling said automatic changer system, said control unit including storage means comprising first storage means for storing said control program and second storage means; and program rewriting means responsive to an application of a program rewrite command, for permitting said medium selecting unit to select a storage medium with a new control program from said plurality of storage media, under control of said control unit, and for reading said new control program from the selected storage medium to replace said control program stored in said first storage means with said new control program.

2. An automatic changer system as set forth in claim 1, wherein:

said program rewriting means includes means for copying said control program stored in said first storage means to said second storage means which functions on a temporary memory so that said control unit temporarily executes said control program temporarily stored in said second storage means, and means for replacing said control program stored in said first storage means with said new control program so that said control unit executes said new control program.

3. An automatic changer system as set forth in claim 1 further comprising information recording means responsive to an application of an intra-system stored information recording command, for writing information stored in said second storage means into a selected one of said plurality of storage media.

4. An automatic changer system as set forth in claim 3 wherein:

said program rewrite command is applied after an input of a normal password.

5. An automatic changer system as set forth in claim 4 wherein:

said program rewrite command is applied further after a validation operation has been normally performed two times.

6. An automatic changer system as set forth in claim 5 wherein:

said program rewrite command is applied from an external host computer.

7. An automatic changer system capable of rewriting a control program for controlling the system comprising:

a medium insertion/discharge unit for inserting and discharging a storage medium storing a program and data;

a medium storing unit for storing at least one storage medium storing a program and data;

a medium selecting unit for selecting a specific storage medium from a plurality of storage media comprising the storage medium inserted in said medium insertion/discharge unit and at least one storage medium stored in said medium storing unit;

a control unit for controlling a selection of a storage medium in said medium selecting unit according to a control program for controlling said automatic changer system, said control unit including storage means comprising first storage means for storing said control program and second storage means; and program rewriting means responsive to an application of a program rewrite command, for permitting said medium selecting unit to select a storage medium with a new control program from said plurality of storage media under control of said control unit, for reading said new control program from the selected storage medium, for erasing said control program stored in said first storage means, and for storing said new control program into said first storage means.

8. An automatic changer system as set forth in claim 7, wherein:

said program rewriting means includes means for copying said control program stored in said first storage means to said second storage means which functions on a temporary memory so that said control unit temporarily executes said control program temporarily stored in said second storage means, for erasing said control program storm in said first storage, and for storing said new control program into said first storage means so that said control unit executes said new control program.

9. An automatic changer system as set forth in claim 7, further comprising information recording means responsive to an application of an intrasystem stored information recording command, for wilting information stored in said second storage means into a selected one of said plurality of storage media.

10. An automatic changer system as set forth in claim 9 wherein:

said program rewrite command is applied after input of a normal password.

11. An automatic changer system as set forth in claim 10 wherein:

said program rewrite command is applied further after a validation operation has been normally performed two times.

12. An automatic changer system as set forth in claim 11, wherein:

said program rewrite command is applied from an external host computer.

13. An automatic changer system capable of rewriting a control program for controlling the system comprising:

a medium insertion/discharge unit for inserting and discharging a storage medium, storing a program and dam;

a medium storing unit for storing at least one storage medium storing a program and data;

a medium selecting unit for selecting a specific storage medium from a plurality of storage media comprising the storage medium inserted in said medium insertion/discharge unit and at least one storage medium stored in said medium storing unit, and for transferring the selected storage medium;

a control unit for controlling a selection of a storage medium in said medium selecting unit according to a control program for controlling said automatic changer system, said control unit including storage means comprising first storage means for storing said control program and second storage means;

a recording/reproducing unit for selectively reading and writing information from and into the selected storage medium; and program rewriting means responsive to an application of a program rewrite command, for permitting said medium selecting unit to select a storage medium with a new control program from said plurality of storage medium under control of said control unit, and to transfer the selected storage medium to said recording/reproducing unit, for reading said new control program from the selected storage medium transferred, for erasing the control program stored in said first storage means, and for storing said new control program into said first storage means.

14. An automatic changer system as set forth in claim 13, wherein:

said program rewriting means further includes means for copying said control program in said first storage means to said second storage means which functions on a temporary memory so that said control unit temporarily executes said control program temporarily stored in said second storage means, for erasing said control program stored in said first storage means, and for storing said new control program in said first storage means so that said control unit executes said new control program.

15. An automatic changer system as set forth in claim 13, further comprising information recording means responsive to an application of an intra-system stored information recording command, for writing information stored in said second storage means into a selected one of said plurality of storage media.

16. An automatic changer system as set forth in claim 15, wherein:

said program rewrite command is applied after input of a normal password.

17. An automatic changer system as set forth in claim 16, wherein:

said program rewrite command is applied after a validation operation has been performed two times.

18. An automatic changer system as set forth in claim 17, wherein:

said program rewrite command is applied from an external host computer.

* * * * *

UNITED STATES PATENT AND TRADEMARK OFFICE
CERTIFICATE OF CORRECTION

PATENT NO. : 5,657,301
DATED : AUGUST 12, 1997
INVENTOR(S) : YOSHIKAWA, ET AL

It is certified that error appears in the above-identified patent and that said Letters Patent is hereby corrected as shown below:

Column 9, line 18, change "storm" to --stored--;
Column 9, line 25, change "wilting" to --writing--;
Column 9, line 45, change "dam" to --data--.

Signed and Sealed this

Twentieth Day of January, 1998

Attest:

BRUCE LEHMAN

Attesting Officer

Commissioner of Patents and Trademarks